UNITED STATES PATENT OFFICE.

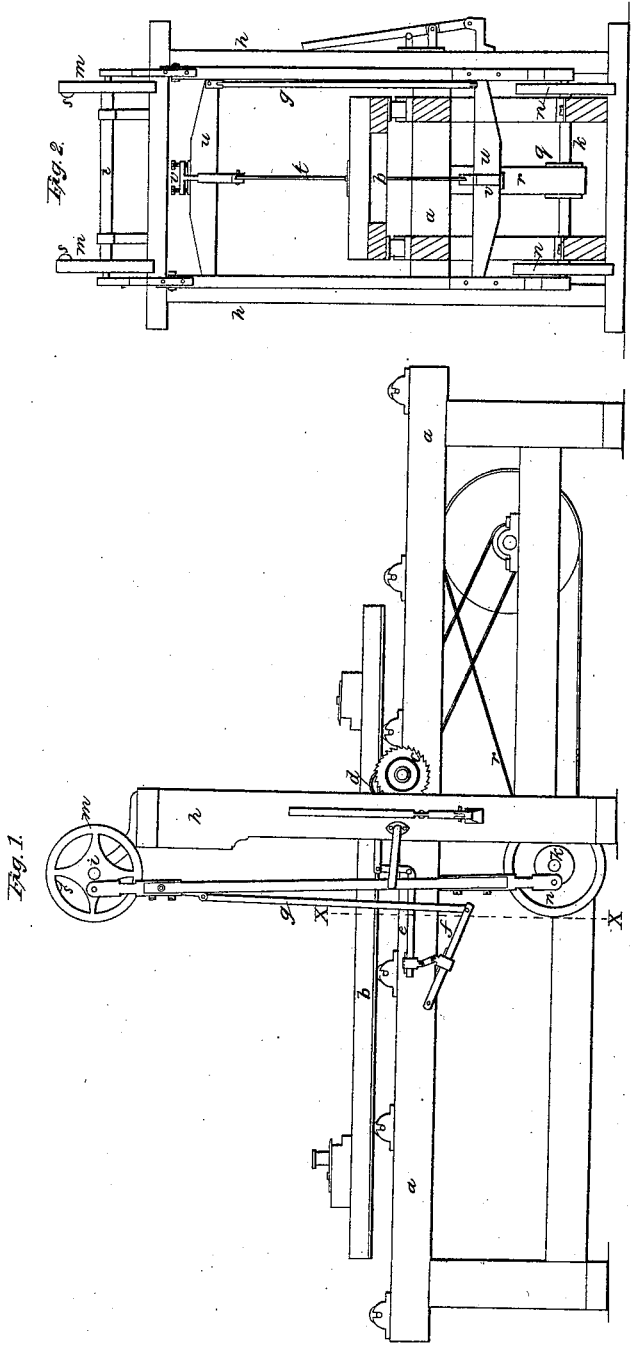
P. G. Gardiner,
Reciprocating Saw Mill.
Nº 5,070.
Patented Apr. 17, 1847.

P. G. GARDINER, OF NEW YORK, N. Y.

SAWMILL.

Specification of Letters Patent No. 5,070, dated April 17, 1847.

*To all whom it may concern:*

Be it known that I, P. G. GARDINER, of the city, county, and State of New York, have invented a new and useful Improvement in Sawmills, and that the following is a full, clear, and exact description of the principle or character which distinguishes it from all other things before known and of the manner of making, constructing, and using the same, reference being had to the accompanying drawings, making part of this specification, in which—

Figure 1 is a side elevation of a saw mill on my improved plan, and Fig. 2, a cross vertical section taken at the line (XX) of Fig. 1 to exhibit the manner of hanging the saw and operating the saw gate.

The same letters indicate like parts in all the figures.

The nature of my invention consists in operating the saw, when hung and strained in a frame or gate, by means of two cranks at top and bottom, so that it shall gradually approach and cut into the wood during one half of the downward stroke, and then draw back to discharge the saw dust from the teeth of the saw and permit the carriage to feed or move the log forward preparatory to the next cut.

In the saw mills generally employed the gate works in straight slides, and the saw has what is called the "rake", that is, the line of the teeth is diagonal with the line of motion of the saw, so that as the saw descends each descending tooth shall cut deeper into the wood. This is done to avoid the necessity of moving forward the carriage with the log on it while the saw is cutting. But this plan presents some very serious difficulties. As the saw is carried up preparatory to another cut it moves in the same line as in descending, and as it rises the log is fed forward which prevents the discharge of the saw dust from the kerf and that portion of the teeth which remain in the kerf, and thus prevent these teeth from cutting at the commencement of the downward stroke. This objection has been so well recognized that numerous devices have been invented with the view to avoid it, but without success. By some the lower end of the gate has been attached to cranks and the upper end working in straight slides, but this, while it attained the important end of clearing the saw teeth does not give an effective cutting motion to the saw, for as the lower end of the saw advances toward the log and descends the upper end by its vertical motion in the slides does not move toward the wood, and hence that part of the saw which should cut is actually receding from the log. To avoid this latter defect in the cutting action and retain the advantage of clearing the teeth, another device was invented and patented which consists in substituting curved slides at the upper end, but this only rendered the defect more apparent, for the rapidity of motion of a saw gate of the weight required will not admit of a curvilinear motion in slides, as is well known to mechanicians; and besides this serious objection, the upper end of the saw does not move back fast enough to admit of the requisite forward movement of the log. This was followed by hanging the upper end of the gate to vibrating arms, which in practice proved less effectual than the straight slides, for (without an equal amount of firmness and stability) the curve generated by the vibration of the arms at the upper end deviates but little from a straight line and does not admit of sufficient back movement for the motion of the log preparatory to another cut, which is indispensable. Another plan consists of a saw without a gate attaching the saw, at both ends to a crank the lower one of which rotates, and the upper one of greater radius, to vibrate in the segment of a circle, so that the upper end of the saw returns in the same track as it descended, which carries the upper end of the saw in its upward movement forward toward the log instead of drawing it back, and therefore more defective than the plans above pointed out. The inventor of this latter plan also suggests another which consists in attaching both ends of the saws to rotating cranks, which gives the required motion to the saw to give an effective cut and to clear the teeth of dust, for each tooth generates a perfect circle; but in this plan the saw is without a gate and the two cranks depend for their equal motion upon the stiffness of the saw, which is impracticable as it would require to be made too thick. But by my improvement the saw is strained in a gate in the usual manner and the gate is hung to two cranks at each end to insure steadiness of motion.

In the accompanying drawings (*a*) represents the frame of the mill which may be constructed in any desired manner; (b) the carriage moved by the rag wheel (c) that is operated by the hand (d), connected with the saw gate by the levers (e, f) and connecting rods (g). In front of the fender posts (h, h,) there are two parallel shafts (i, k) one at top and the other at the bottom, each having a fly wheel and crank (m, m) and (n, n,) at each end, to which are hung the side pieces (o, o) of the saw gate (p), which extends sufficiently far beyond the cross bars of the gate to admit of its working free of the fly wheels. The lower crank shaft (k) is provided with a pulley (q) to receive motion by a belt (r) from any first mover; and the fly wheels of the upper crank shaft (i) are loaded with weights (s, s) placed at right angles to the cranks to carry them over the dead points and insure the rotation of this shaft after it has been started and when at rest to keep them in a position ready for starting.

The saw (t) is hung to the cross bars (u, u) of the gate, and strained by means of stirrups (v, v) in the usual manner.

What I claim as my invention and desire to secure by Letters Patent is—

Hanging the saw gate, in which a saw or saws can be strained in the usual or any desired manner, to the cranks of two crank shafts, one at each end of the gate, substantially in the manner and for the purpose specified, whereby the saw receives a motion which causes each tooth to generate a perfect circle to give a more effective cut, discharge the saw dust, and relieve itself for a repetition of the cut more effectively than by any other plan with which I am acquainted.

P. G. GARDINER.

Witnesses:
M. B. BEARDSLEY,
H. C. LAURIER.